US011570967B2

(12) United States Patent
Tu

(10) Patent No.: US 11,570,967 B2
(45) Date of Patent: Feb. 7, 2023

(54) FEEDING DEVICE WITH QUANTITATIVE MECHANISM

(71) Applicant: KINPO ELECTRONICS, INC., New Taipei (TW)

(72) Inventor: Wen-Kai Tu, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 121 days.

(21) Appl. No.: 17/330,171

(22) Filed: May 25, 2021

(65) Prior Publication Data

US 2022/0322637 A1   Oct. 13, 2022

(30) Foreign Application Priority Data

Apr. 8, 2021   (TW) .................................. 110112658

(51) Int. Cl.
*A01K 5/02*   (2006.01)
*A01K 5/01*   (2006.01)

(52) U.S. Cl.
CPC .......... *A01K 5/0275* (2013.01); *A01K 5/0114* (2013.01); *A01K 5/0225* (2013.01)

(58) Field of Classification Search
CPC .. A01K 5/0275; A01K 5/0114; A01K 5/0225; A01K 5/002
See application file for complete search history.

(56) References Cited

U.S. PATENT DOCUMENTS

| 6,487,987 B1 * | 12/2002 | Choi | A01K 5/0291 |
| | | | 119/51.5 |
| 2022/0039351 A1 * | 2/2022 | Kim | A01K 5/0225 |
| 2022/0322634 A1 * | 10/2022 | Tu | B01F 27/191 |

FOREIGN PATENT DOCUMENTS

FR   2960743 A1 * 12/2011   ........... A01K 5/0275

* cited by examiner

*Primary Examiner* — Ebony E Evans
(74) *Attorney, Agent, or Firm* — Chun-Ming Shih; HDLS IPR Services

(57) ABSTRACT

A feeding device includes a base, a storage barrel, a hopper, a blocking door and a ratchet turning wheel. The storage barrel is disposed above the base, and a collecting passage is extended from the bottom of the storage barrel. A discharge port is disposed on the collecting passage. The hopper is accommodated in the collecting passage. The blocking door shields the discharge port. The ratchet turning wheel is installed on the base and disposed below the hopper. The ratchet turning wheel includes a wheel and ratchet teeth arranged annularly on the periphery of the wheel. An outer periphery of the ratchet teeth abuts against the hopper to push the hopper to move up or down. The wheel is extended with a lever to open the blocking door. Therefore, the feed may be filled in the collecting channel, and the feeding device has the effect of quantitative feeding.

11 Claims, 9 Drawing Sheets

FEEDING DEVICE WITH QUANTITATIVE MECHANISM

BACKGROUND

Technical Field

The technical field relates to a feeding device for a feed, and particularly relates to a feeding device with a quantitative mechanism.

Description of Related Art

Most pet owners pour the needed feed in the bowl for pets to eat while they are not at home. However, the above method has problems of irregular feeding time, unable to separate meals, and hygiene issue. In this condition, pets may overeat at the beginning and become hungry later, and that is harmful to the pets' health.

Therefore, an automatic feeder is provided in the related art. The automatic feeder includes a storage barrel and a gate valve switch installed at the opening of the storage barrel. The pet owner may pour the feed in the storage barrel first, and then the gate valve switch is turned on to expose the opening on the preset time. Thus, the feed may fall out from the opening of the storage barrel, and a meal of feed is provided.

However, when the opening of the storage barrel is blocked by the feed, the feed may not, or only a few feed, fall out from the opening of the storage barrel while the gate valve switch is turned on, and the automatic feeder may fail to discharge accurately. Therefore, how to design an automatic feeder of providing a pre-determined quantity of feed without jamming is the object of this disclosure.

In view of the above drawbacks, the inventor proposes this disclosure based on his expert knowledge and elaborate researches in order to solve the problems of related art.

SUMMARY OF THE DISCLOSURE

This disclosure is directed to provide a feeding device with a quantitative mechanism. The outer periphery of the ratchet teeth abuts against the hopper to push the hopper to move up or down. As a result, the feed may be filled in the collecting channel to achieve the effect of quantitative feeding.

One of the exemplary embodiments, a feeding device with a quantitative mechanism includes a base, a storage barrel, a hopper, a blocking door and at least one ratchet turning wheel. The storage barrel is disposed above the base, and a collecting passage is extended from a bottom of the storage barrel, and a discharge port is disposed on the collecting passage. The hopper is accommodated in the collecting passage. The blocking door shields the discharge port. The at least one ratchet turning wheel is installed on the base and disposed below the hopper, and the at least one ratchet turning wheel includes a wheel and a plurality of ratchet teeth arranged annularly on an outer periphery of the wheel, and an outer periphery of the ratchet teeth abuts against the hopper to push the hopper to move up or down. The wheel is extended with at least one lever to push the blocking door to be opened.

One of the exemplary embodiments, when the ratchet turning wheel rotates a circle, the outer periphery of the ratchet teeth may push the hopper to move up and down several times for ensuring that the collecting channel is filled with feed. Then, when the ratchet turning wheel drives the lever to push the blocking door to be opened, the feed in the collecting channel may fall from the discharge port at the same time to achieve the advantages of discharging smoothly and quantitative feeding for the feeding device.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Figure 1:
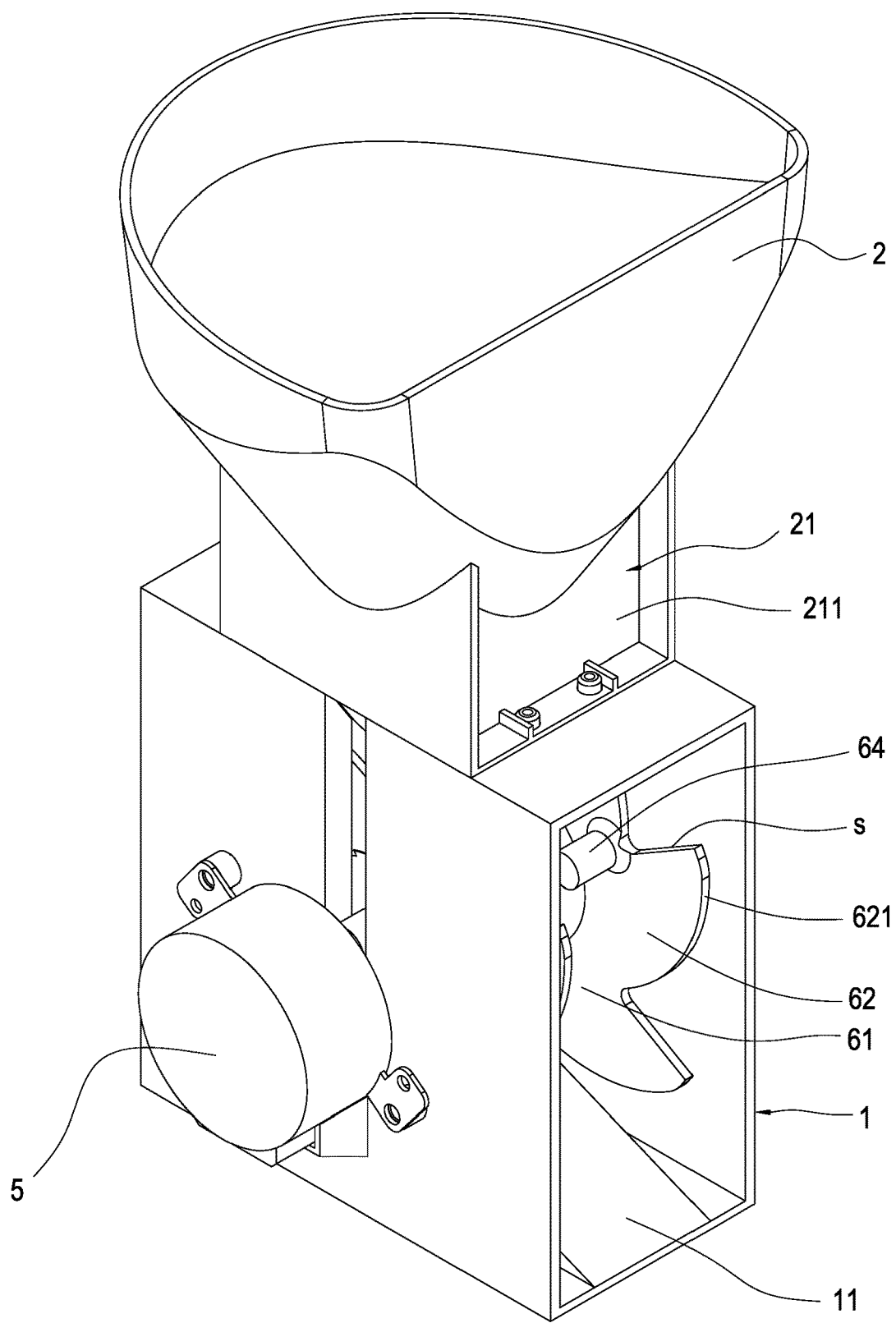
FIG. 1 is a perspective assembly view of the feeding device of this disclosure.

The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIG. 1 to FIG. 9. This disclosure provides a feeding device with a quantitative mechanism. The feeding device 10 mainly includes a base 1, a storage barrel 2, a hopper 3, a blocking door 4 and one or a plurality of ratchet turning wheels 6.

As shown in FIG. 1 to FIG. 9, the storage barrel 2 is used to store feed (pellets) 100. The storage barrel 2 is disposed above the base 1, and a collecting passage 21 is extended from the bottom of the storage barrel 2 and accommodated in the base 1. A discharge port 22 is disposed on the collecting passage 21, and the base 1 includes a guiding slope 11 disposed below the discharge port 22.

Additionally, the collecting passage 21 includes a tube 211 extended downward from the bottom of the storage barrel 2 and an L-shaped baffle 212 extended downward from the bottom of the tube 211. A discharge port 22 is disposed on one side of the L-shaped baffle 212, and two sides of the L-shaped baffle 212 are provided with two notches 214 recessed inward. The diameter of each of the notches 214 is less than that of the feed 100. As a result, the feed 100 in the collecting passage 21 may not drop from the notches 214.

As shown in FIG. 2 to FIG. 9, the hopper 3 is accommodated in the collecting passage 21. The hopper 3 includes a funnel-shaped cup 31, and an opening 32 is provided in the middle of the funnel-shaped cup 31. Two protruding tabs 33 located on two sides of the opening 32 are extended downward from the bottom of the funnel-shaped cup 31, and two ribs 331 protrude from outer sides of the two protruding tabs 33. The rib 331 of this embodiment includes an I-shaped rib, but it is not limited, and the rib 331 may be configured in any shape.

As shown in FIG. 2 to FIG. 9, the blocking door 4 shields the discharge port 22. Further explanation is as follows. The blocking door 4 of this embodiment is fixed on the tube 21 and made of sheet-type flexible material. To increase the flexibility of the blocking door 4, the blocking door 4 of this embodiment includes a U-shaped plate, but it is not limited thereto. The blocking door 4 may be any shape of flexible sheet, or the blocking door 4 may be pivoted to the tube 211. The blocking door 4 may also be made of inflexible materials such as plastic sheet or metal sheet.

Moreover, the blocking door 4 of this embodiment includes a U-shaped plate, and a through hole is disposed in the middle of the U-shaped plate. The diameter of the through hole, located in the middle of the U-shaped plate, is less than that of the feed 100. As a result, the feed 100 in the collecting channel 21 may not fall out from the through hole of the U-shaped plate.

Furthermore, the blocking door 4 is disposed on one side of the L-shaped baffle 212, and a first accommodating space 23 located below the opening 32 is enclosed collectively by the blocking door 4, the L-shaped baffle 212 and the base 1.

Figure 2:
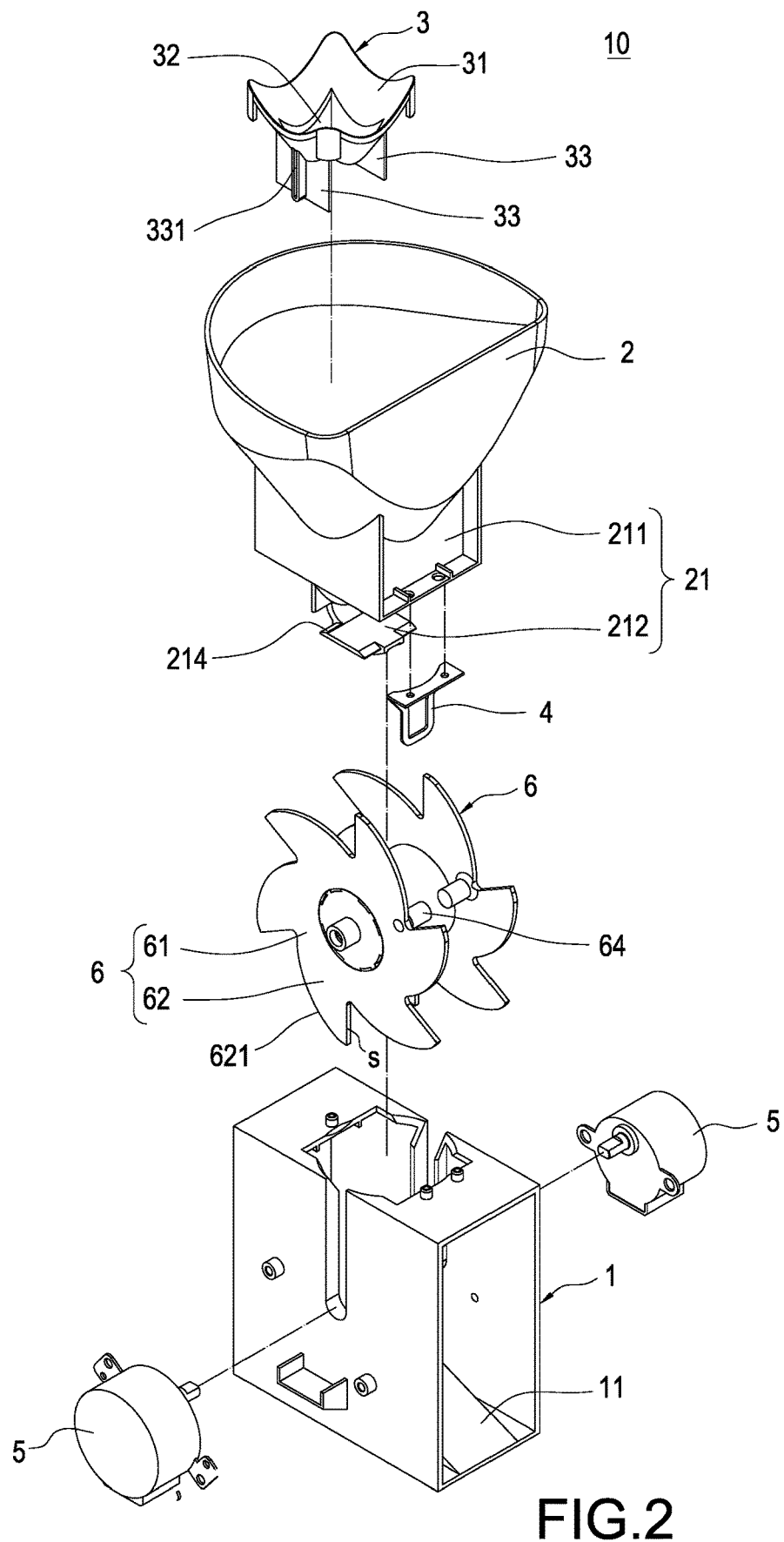
FIG. 2 is a perspective explosion view of the feeding device of this disclosure.
Figure 3:
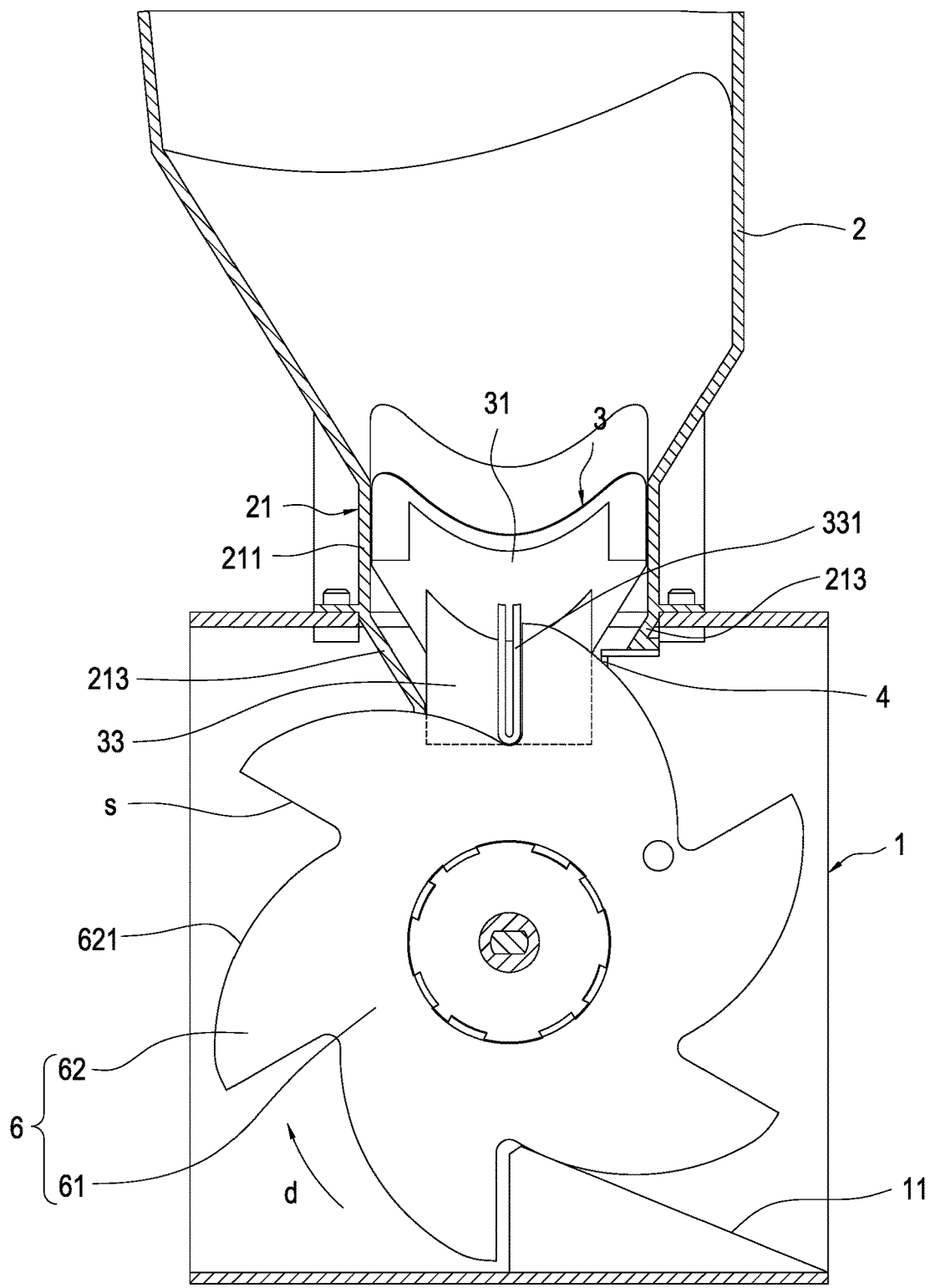
FIG. 3 is a first operation status view of the feeding device of this disclosure.
Figure 4:
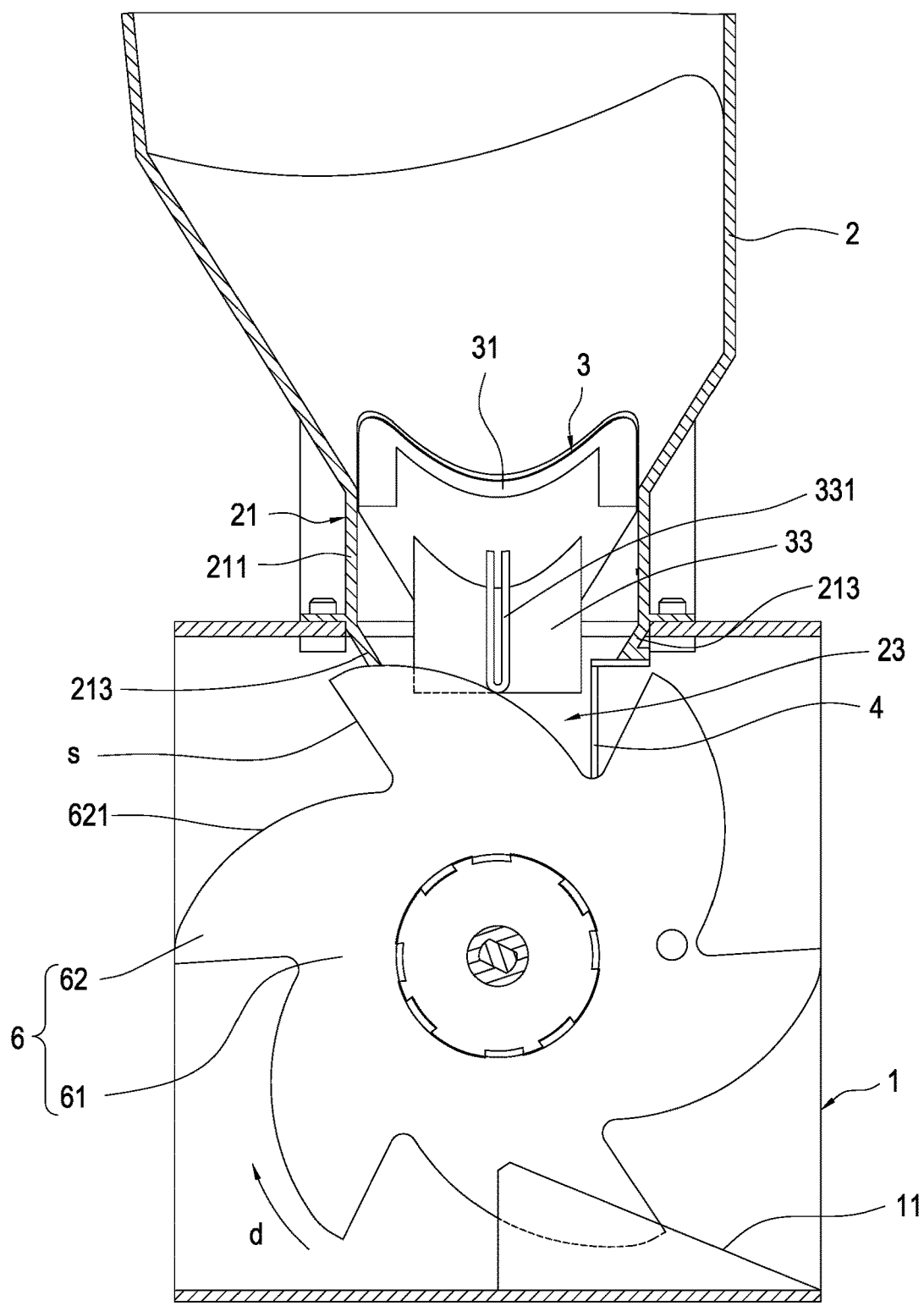
FIG. 4 is a second operation status view of the feeding device of this disclosure.
Figure 5:
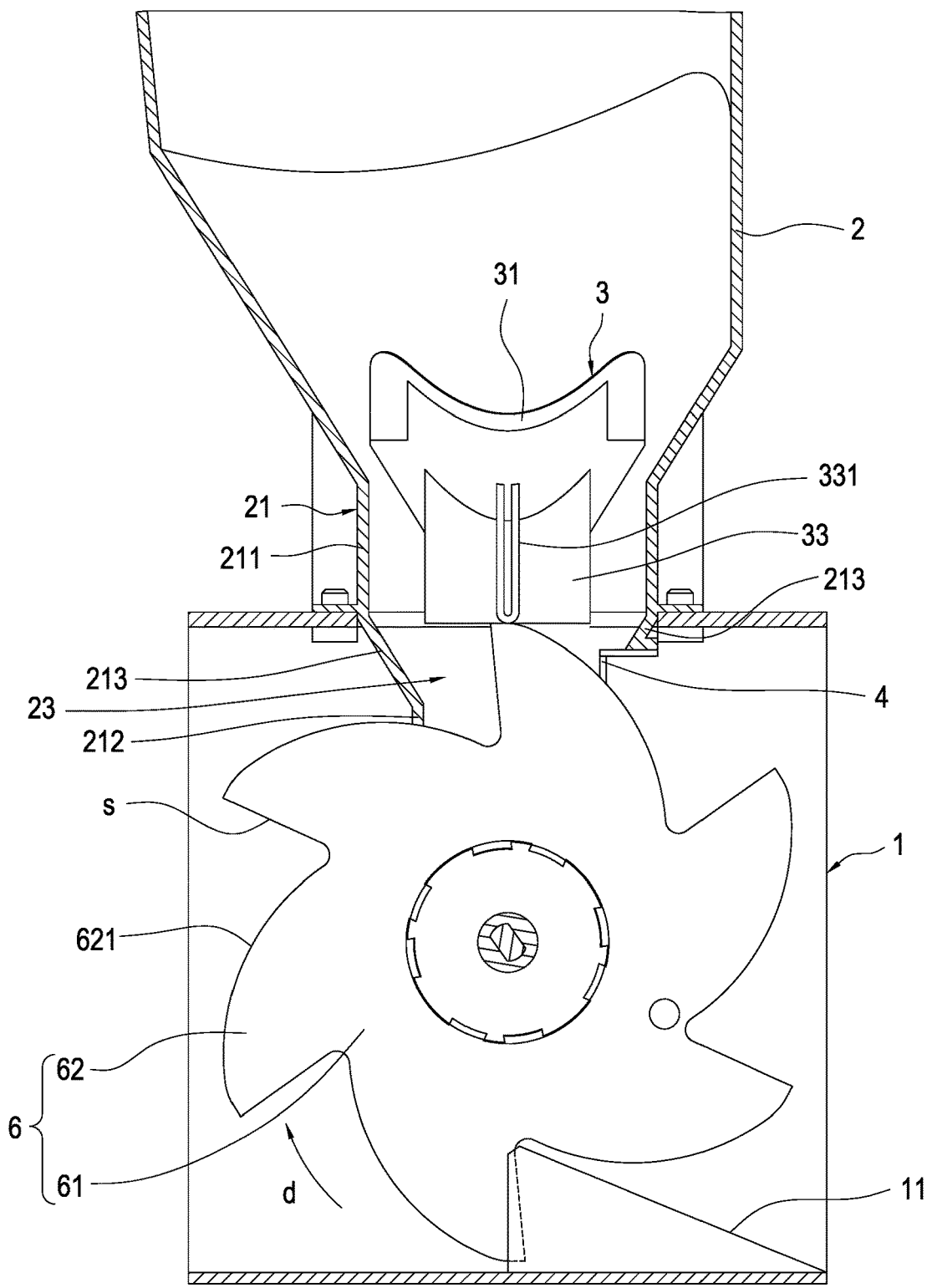
FIG. 5 is a third operation status view of the feeding device of this disclosure.
Figure 6:
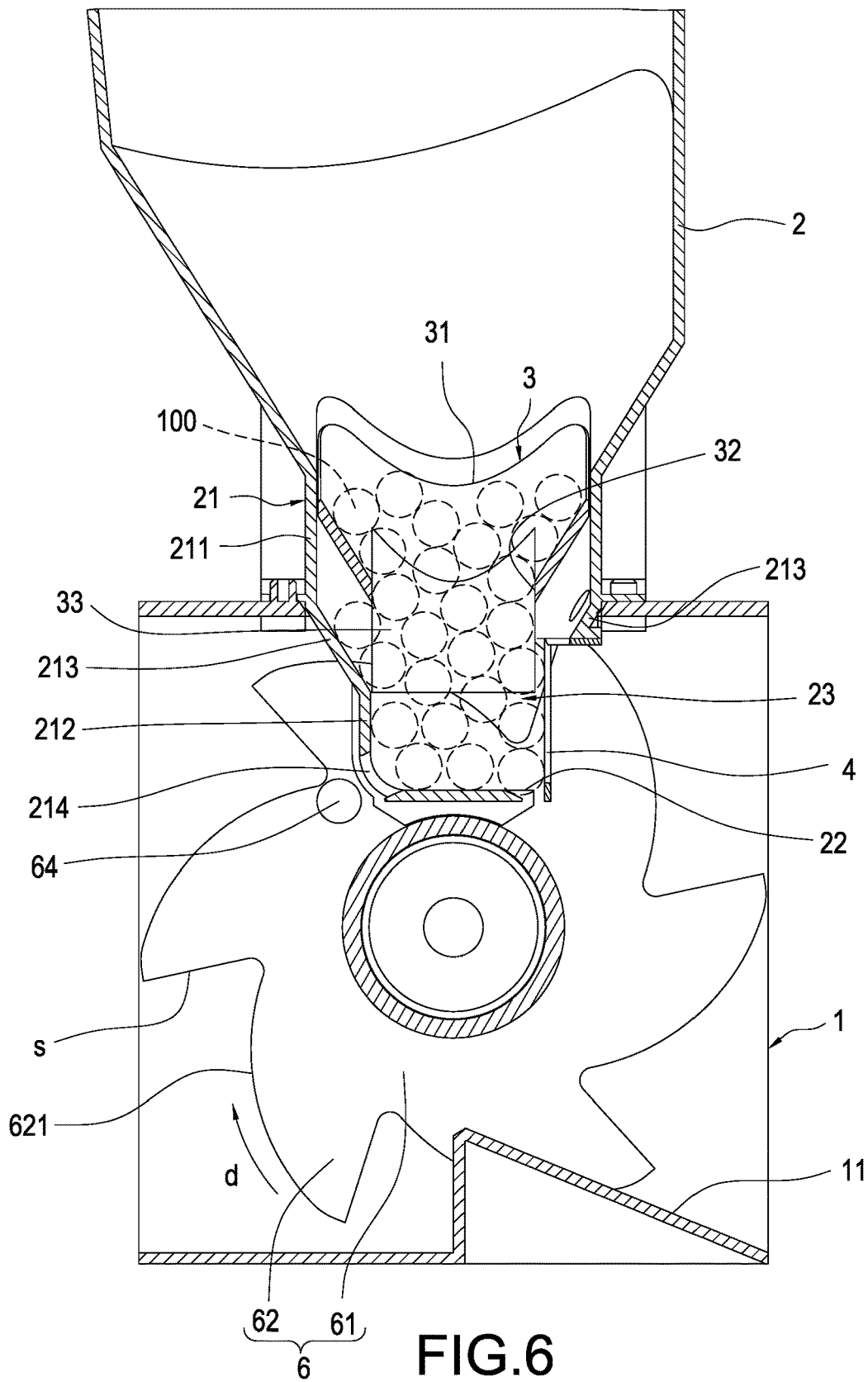
FIG. 6 is a fourth operation status view of the feeding device of this disclosure.
Figure 7:
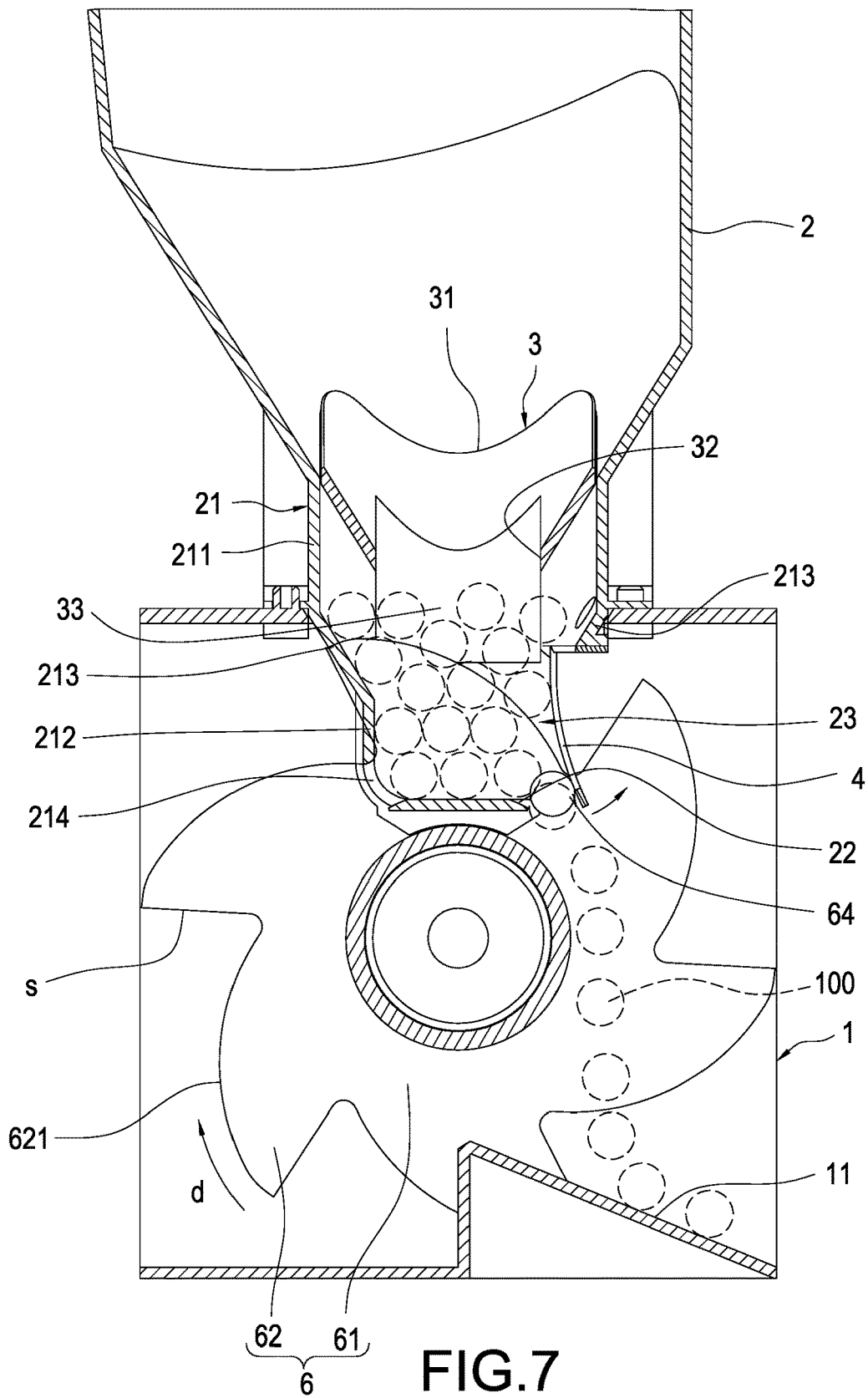
FIG. 7 is a fifth operation status view of the feeding device of this disclosure.
Figure 8:
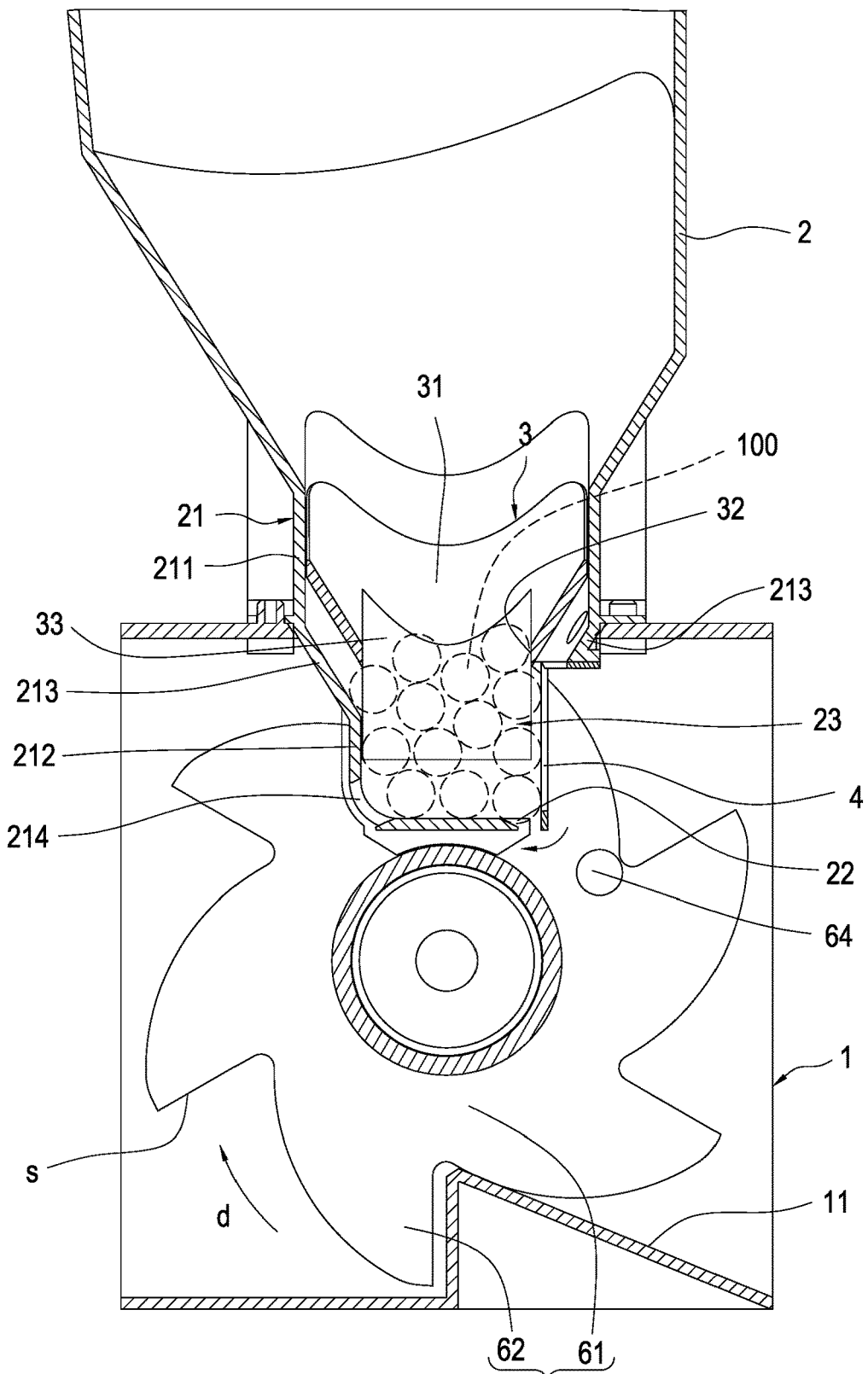
FIG. 8 is a sixth operation status view of the feeding device of this disclosure.
Figure 9:
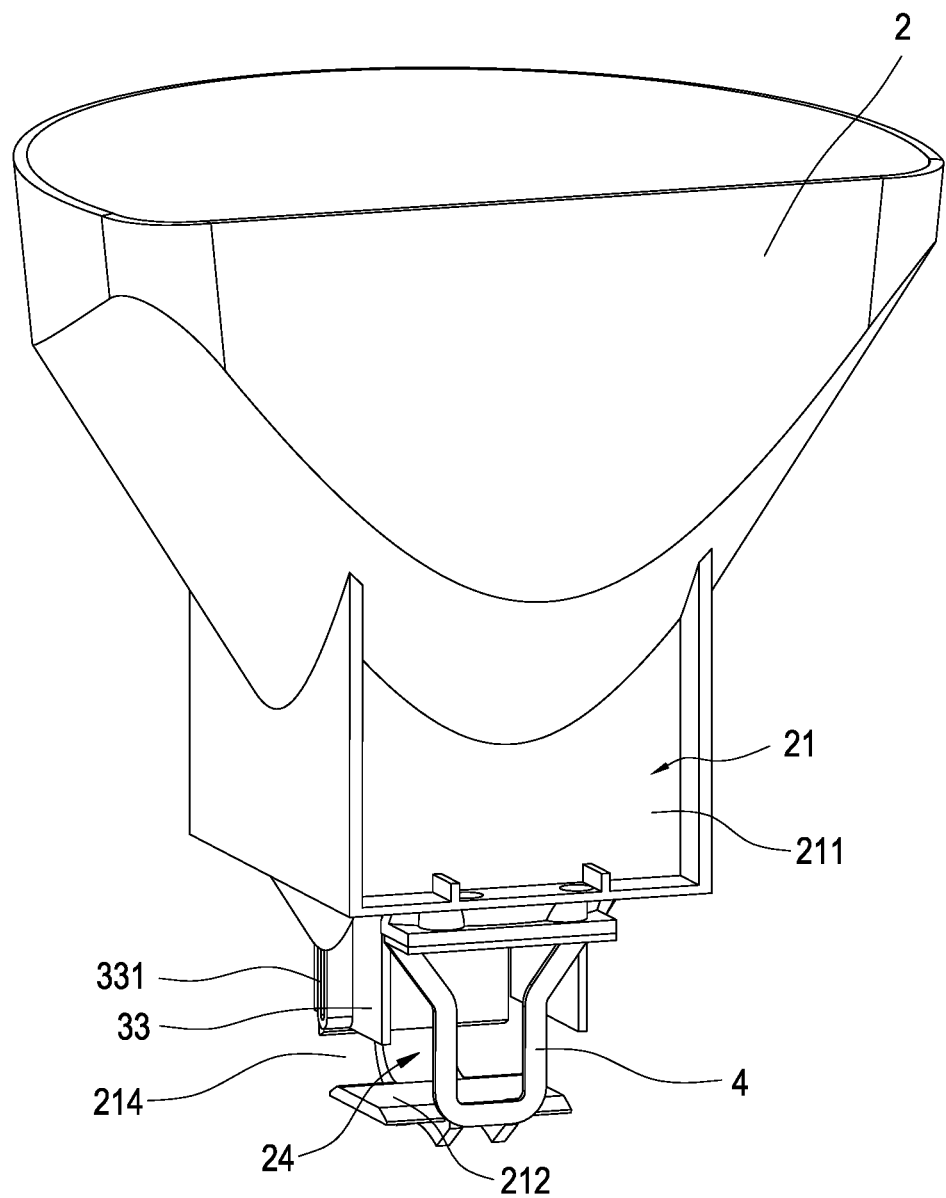
FIG. 9 is a perspective assembly view of the storage barrel, the hopper and the blocking door of this disclosure.

As shown in FIG. 1 to FIG. 2, the feeding device 10 of this disclosure further includes one or a plurality of motors 5. The quantity of the motors 5 of this embodiment is two, and the two motors 5 are installed on two sides of the base 1, but it is not limited thereto.

As shown in FIG. 1 to FIG. 8, the quantity of the ratchet turning wheels is two, and the two ratchet turning wheels 6 are arranged spacedly and overlapped with each other, but this is not limited thereto. In other words, the shapes of the two ratchet turning wheels 6 are similar to each other, and the two ratchet turning wheels 6 are overlapped in a manner of the shapes being aligned with each other.

The ratchet turning wheels 6 are installed on the base 1 and disposed below the hopper 3. Each ratchet turning wheel 6 includes a wheel 61 and a plurality of ratchet teeth 62 arranged annularly on the outer periphery of the wheel 61, and an outer periphery of the ratchet teeth 62 abuts against the hopper 3 to push the hopper 3 to move up or down.

Furthermore, each wheel 61 is extended with one or a plurality of levers 64. In this embodiment, the quantity of the lever 64 extended from each wheel 61 is one, but this is not limited thereto. Two levers 64 may be able to pass through the two notches 214 of the L-shaped baffle 212 and push the blocking door 4 to be opened.

More detailed is as follows. Two ratchet turning wheels 6 are pivoted on two sides of the base 1. Outer peripheries of the ratchet teeth 62 of the two ratchet turning wheels 6 abut against the two ribs 331 respectively, and each ratchet turning wheel 6 is driven by the motor 5 to rotate along a rotating direction d. Each of the ratchet teeth 62 includes a protruding arc edge 621 on outer periphery thereof with a thickness gradually decreased along the rotating direction d, and a step s is configured between two protruding arc edges 621 adjacent to each other.

Moreover, two clamping blocks 213 are arranged oppositely on the inner wall of the tube 211. The funnel-shaped cup 31 may not be pushed by the ratchet turning wheel 6. The funnel-shaped cup 31 abuts against the two clamping blocks by its own gravity. The two protruding tabs 33 are located on two sides of the blocking door 4 and the L-shaped baffle 212, and a second accommodating space 24 located below the opening 32 is enclosed collectively by the blocking door 4, the L-shaped baffle 212 and the two protruding tabs 33.

As shown in FIG. 3 to FIG. 8, they depict the operation status of the feeding device 10 of this disclosure. The ratchet turning wheel 6 is driven by the motor 5 to rotate along the rotating direction d. Because the outer periphery of the ratchet teeth 62 abuts against the rib 331, the rib 331 is pushed up by one of the protruding arc edges 621 and moves upward gradually. After that, the rib 331 passes the step s and suddenly drops to another protruding arc edge 621 to drive the funnel-shaped cup 31 to move up and down. Additionally, the feed 100 are pushed from the storage barrel 2 into the opening 32 when the funnel-shaped cup 31 is in the process of moving up and down. As a result, part of the feed 100 may be accumulated in the collecting channel 21 and the first accommodating space 23.

Therefore, when the ratchet turning wheel 6 rotates a circle, the outer periphery of the ratchet teeth 62 may push the hopper 3 to move up and down several times for ensuring that the collecting channel 21 and the first accommodating space 3 are filled with feed 100. Then, when the ratchet turning wheel 6 drives the lever 64 to open the blocking door 4, the feed 100 in the collecting channel 21 and the first accommodating space 23 may fall on the guiding slope 11 through the discharge port 22 at once. The guiding slope 11 further guides the feed 100 to fall out from the base 1. Therefore, the feeding device 10 has the advantages of feeding smoothly and quantitative feeding.

Additionally, because the inner periphery of the collecting channel 21 is less than that of the storage barrel 2, the feed 100 easily block the neck where the storage barrel 2 and the collecting channel 21 are interconnected. However, the moving up and down of the hopper 3 in the collecting channel 21 may push the jamming feed 100 and guide the feed 100 to fall into the collecting channel 21. Therefore, the jamming of the feeding device 10 may be avoided.

Moreover, the blocking door 4 of this embodiment is made of sheet-type flexible material. The blocking door 4 includes a U-shaped plate, and the lever 64 may open the blocking door 4 easily to let the feed 100 fall out from the discharge port 22 smoothly. As a result, the discharging of feeding for the feeding device 10 is improved.

Furthermore, when the storage bucket 2 needs to be refilled, cleaned or repaired and the storage barrel 2 is picked up from the base 1, the funnel-shaped cup 31 abuts against the two clamping blocks 213 by its own gravity, so that the funnel-shaped cup 31 may not be pushed by the ratchet turning wheel 6. At the same time, two protruding tabs 33 are located on two sides of the blocking door 4 and the L-shaped baffle 212. The second accommodating space 24 located below the opening 32 is enclosed collectively by the blocking door 4, the L-shaped baffle 212 and the two protruding tabs 33. As a result, the feed 100 are blocked in the second accommodating space 24 without falling, so as to facilitate operations of refilling, cleaning or repairing, etc., for the storage barrel 2. Therefore, the feeding device 10 has the characteristics of preventing feed 100 from leaking and is convenient for use.

While this disclosure has been described by means of specific embodiments, numerous modifications and variations could be made thereto by those skilled in the art without departing from the scope and spirit of this disclosure set forth in the claims.

What is claimed is:

1. A feeding device with a quantitative mechanism, comprising:
    a base;
    a storage barrel, disposed above the base, and a collecting passage extended from a bottom of the storage barrel, and a discharge port disposed on the collecting passage;
    a hopper, accommodated in the collecting passage;
    a blocking door, shielding the discharge port; and
    at least one ratchet turning wheel, installed on the base and disposed below the hopper, and comprising a wheel and a plurality of ratchet teeth arranged annularly on outer periphery of the wheel, and outer periphery of the ratchet teeth abutting against the hopper to push the hopper to move up or down, and at least one lever extended from the wheel pushing the blocking door to be opened.

2. The feeding device with the quantitative mechanism according to claim 1, further comprising: at least one motor, installed on the base, wherein the at least one ratchet turning wheel is driven by the at least one motor to rotate along a rotating direction, and each ratchet teeth comprises a protruding arc edge on outer periphery thereof with a thickness gradually decreased along the rotating direction, and a step is configured between two protruding arc edges adjacent to each other.

3. The feeding device with the quantitative mechanism according to claim 2, wherein a quantity of the motor and the ratchet turning wheel is two respectively, and two ratchet turning wheels are pivoted on two sides of the base, and each of the ratchet turning wheels is driven by each motor and rotates along the rotating direction.

4. The feeding device with the quantitative mechanism according to claim 1, wherein the hopper comprises at least one rib, and outer periphery of the ratchet teeth of the at least one ratchet turning wheel abuts against the at least one rib.

5. The feeding device with the quantitative mechanism according to claim 4, wherein the hopper comprises a funnel-shaped cup, and an opening is disposed in a middle of the funnel-shaped cup.

6. The feeding device with the quantitative mechanism according to claim 5, wherein the collecting passage comprises a tube extended downward from the bottom of the storage barrel and an L-shaped baffle extended downward from a bottom of the tube, and the discharge port is disposed on one side of the L-shaped baffle, and the blocking door is fixed on the tube and disposed on one side of the L-shaped baffle, and a first accommodating space located below the opening is enclosed collectively by the blocking door, the L-shaped baffle and the base.

7. The feeding device with the quantitative mechanism according to claim 6, wherein a quantity of the ratchet turning wheel and the rib is two respectively, and two ratchet turning wheels are arranged spacedly and overlapped with each other, and two protruding tabs located on two sides of the opening are extended downward from a bottom of the funnel-shaped cup, and two ribs protrude from outer sides of the two protruding tabs, and outer peripheries of the ratchet teeth of the ratchet turning wheel abut against the two ribs respectively.

8. The feeding device with the quantitative mechanism according to claim 7, wherein two clamping blocks are arranged oppositely on an inner wall of the tube, and when the funnel-shaped cup abuts against the two clamping blocks, the two protruding tabs are located on two sides of the blocking door and the L-shaped baffle, and a second accommodating space located below the opening is enclosed collectively by the blocking door, the L-shaped baffle and the two protruding tabs.

9. The feeding device with the quantitative mechanism according to claim 6, wherein two sides of the L-shaped baffle are provided with two notches recessed inward, and the at least one lever of the two ratchet turning wheels passes through the two notches.

10. The feeding device with the quantitative mechanism according to claim 6, wherein the blocking door is configured by a sheet-type flexible material, and the blocking door comprise a U-shaped plate.

11. The feeding device with the quantitative mechanism according to claim 1, wherein the base comprises a guiding slope disposed below the discharge port.

* * * * *